Nov. 6, 1934.  J. J. O'NEILL  1,979,637

PISTON RING SIZING MACHINE

Filed June 24, 1933

INVENTOR.
James J. O'Neill
BY Harry C. Schroeder
ATTORNEY

Patented Nov. 6, 1934

1,979,637

UNITED STATES PATENT OFFICE 1,979,637

PISTON RING SIZING MACHINE

James J. O'Neill, Oakland, Calif.

Application June 24, 1933, Serial No. 677,472

4 Claims. (Cl. 51—92)

This invention relates to a piston ring slotting device, particularly a device that is small, compact, and readily manipulated. At present, piston rings are slotted by hand cutting or by the use of expensive lathe attachments. Hand cutting is not satisfactory inasmuch as the ring is very apt not to be cut radially and the faces of the cut not in face to face alignment. The use of expensive lathe attachments is objectionable not only from the standpoint of the cost of the attachment but also because the lathe is not available as such when the attachment is in use.

It is in general the object of the present invention to provide a piston ring cutting device which is simple and cheap, being available as a bench tool.

Another object of the invention is to provide a piston ring slotting device that will enable an operator to slot a ring in any desired position.

The invention possesses other advantageous features and objects some of which, with the foregoing, will appear in the following wherein the preferred form of piston ring slotting device of my invention is disclosed. It is to be understood that variations and changes can be made in my device without departing from the spirit of my invention as it is defined in the claims.

In the drawing accompanying and forming a part hereof, Figure 1 is a plan view of my device.

Figure 3 is a section on the line 3—3 of Figure 2.

Figure 4 is a side elevation of a chuck construction while Figure 5 is a plan thereof.

Figure 1:
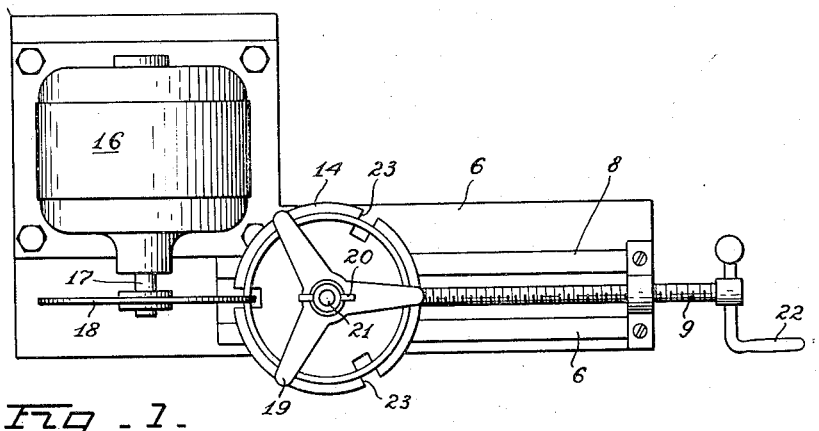

In the preferred form of the invention, I provide a base plate or bed. A standard 7 is slidable along track 8 on the base plate, a screw 9 being provided to enable this to be done positively. The standard 7 carries a U member 10 for rotation. An extension 11 is inserted into the standard and enables the member and standard to be secured together. A screw 12 in the standard engages the extension to retain the member in a desired adjustment.

Figure 2:
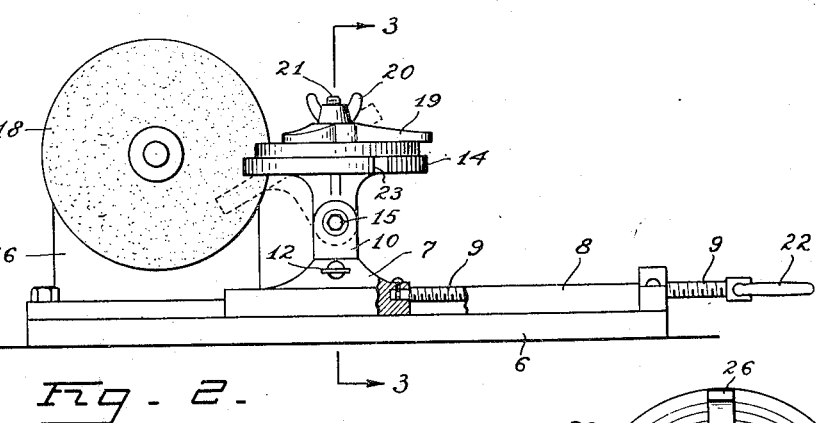
Figure 2 is a side elevation.

A piston ring supporting device 14 is pivoted on member 10 by bolt 15. This pivotable mounting and the rotational mounting of the U member enables the ring supporting device 14 to be moved universally. Thus it can be placed in a horizontal position, in a position at 45° to the vertical, or any other angular position as I have indicated by the dotted lines in Figure 2.

The base also carries a motor 16 having a shaft 17 on which is mounted a cutting saw or carborundum wheel 18. With the motor running, a piston ring having been attached to the supporting device 14 by removable spider 19 and wing nut 20 on stud 21, the screw 9 is turned by handle 22.

The ring is advanced into the path of the cutting element 18 to be slotted in accordance with the setting of the device 14. The device 14 includes suitable apertures 23 so that it is not cut by the cutting element when the ring is slotted.

Figures 3, 4, 5:
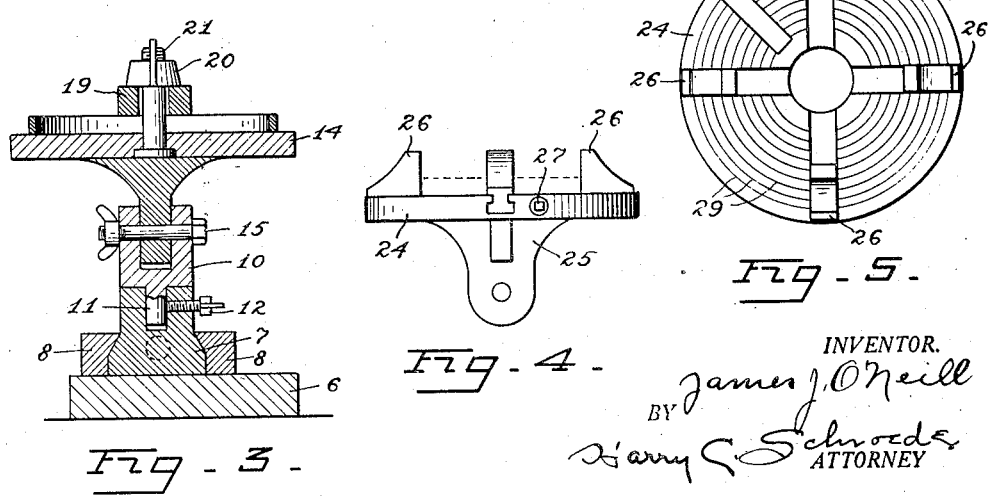

In Figures 4 and 5 I have shown a form of chuck for precision grinding. This includes a chuck body 24 having an extension 25 for mounting on bolt 15 on U member 10. The chuck shown is of the four jaw type, the jaws 26 being movable by adjusting means 27 as is well known. The face of the chuck is slotted as at 28 so that the cutting element does not cut the chuck. Circular grooves 29 are also cut in the chuck face to enable the piston ring to be quickly set up concentrically with the chuck to secure accurate grinding.

I claim:

1. A device for sizing piston rings comprising a base plate, a carriage mounted to travel on said base plate, means for adjusting said carriage along said base plate, a yoke mounted to rotate on a vertical axis in said carriage, a chuck pivoted in said yoke in such manner as to swing upon a horizontal axis, means for releasably holding said chuck in any adjusted angular position with respect to said yoke, and a rotatable cutter supported by said base plate in a position to engage a piston ring carried by said chuck.

2. A device for sizing piston rings comprising a base plate, a carriage mounted to travel along said base plate, means for adjusting said carriage along said base plate, a yoke having an axial extension rotatably mounted in said carriage, means for normally preventing rotation of said yoke, a chuck having a depending portion pivotally engaging said yoke, means for normally preventing pivotal movement of said chuck at any desired angle, a work clamp carried by said chuck, and a cutter supported by said base plate in a normally fixed position and so positioned and arranged as to engage a piston ring carried by said chuck.

3. In combination, a motor having a shaft, a base supporting said motor, a piston ring cutting element carried by said shaft, a member movable on said base toward or away from said cutting element, screw means for moving said member, a U member having an extension rotatable in said movable member, means for engaging said extension to retain said U member in a selected position, a piston ring supporting device including an element insertable into said U member, and means for drawing opposite legs of said member together to retain said element in a selected position.

4. In combination, a motor having a shaft, a base supporting said motor, a piston ring cutting element carried by said shaft, a member movable on said base toward or away from said cutting element, screw means for moving said member, a U member having an extension rotatable in said movable member, means for engaging said extension to retain said U member in a selected position, a piston ring supporting device including an element insertable into said U member, a spider for engaging a piston ring on said supporting device, means for securing said spider in ring engaging position, and means for drawing opposite legs of said member together to retain said element in a selected position.

JAMES J. O'NEILL.